Patented Aug. 1, 1939

2,167,931

UNITED STATES PATENT OFFICE 2,167,931

PURIFICATION OF RELATIVELY WATER IN-SOLUBLE DERIVATIVES OF FATTY ACIDS

Sumner H. McAllister, Lafayette, and George F. Johnson, San Francisco, Calif., assignors to Shell Development Company, San Francisco, Calif., a corporation of Delaware No Drawing. Application June 14, 1937, Serial No. 148,106

15 Claims. (Cl. 260—404)

This invention relates to a process for the separation and purification of the reaction products such as are formed by the reaction of aliphatic carboxylic acids or their derivatives such as esters, acid halides, etc., with water soluble reactants. An available class of reaction products is the imido alkylols which may be prepared by the reaction of one or more mono- or dialkylolamines with a fatty acid or its ester.

The objects of this invention are: first, to remove water soluble impurities from the reaction products; second, to separate the reaction products into fractions of definite characteristics; third, to remove water from the reaction products; and fourth, to increase the yield of recovered products.

The water insoluble derivatives of the fatty acids are rapidly finding new industrial uses. The use of the water insoluble soaps as dry-cleaning agents, driers, oil thickeners, anti-fouling agents, coloring bodies, etc., is known. Imido alkylols have found use as solvents, plasticizers, fillers, gum stabilizers, fixatives, etc. The nitriles, ketones, thioketones, amides, thioamides, etc., derived from fatty acids, have been found useful as oil thickeners, polish ingredients, foam suppressors, wax substitutes, ingredients in high-pressure lubricants, insulating materals, insecticides, etc.

Many of these uses require materials of definite characteristics, and allow little variation. Thus, for example, the presence of about 1% of water soluble impurities in a metal soap renders it unfit for use as an oil thickener; the presence of any substantial quantity of unsaturated metal soap is likewise detrimental. Materials intended for use in polishes, as a wax substitute, in a filler or as a fixative must have definite physical characteristics.

In order to meet these requirements, the present practice follows one of two procedures. First, a raw material of sufficient purity and capable of yielding a single reaction product is used as a source of fatty acid. Since relatively few compounds of such character are available, the number of compounds producible is very much restricted. The crude molten reaction product is generally washed with water. This usually requires a considerable amount of water, usually results in emulsions which may in many cases require days to break, and yields a wet product.

The second method may employ the more common vegetable and animal oils, fats, waxes, etc., as a source of fatty acid. The desired product or products are separated from the mixture of crude reaction products by repeated fractional crystallization. Acetone, alcohol and occasionally sulfuric ether are the commonly used solvents. Since these solvents dissolve considerable of the water soluble impurities, such as glycerine, etc., only the first portion to crystallize is substantially pure. The remainder of the dissolved product is extremely difficult to recover in a pure state. Many of the compounds in question and particularly those derived from unsaturated fatty acids become associated with the solvent and are not easily crystallized.

We have found a method whereby these difficulties may be substantially overcome. According to the present invention, the impure product of reaction is dissolved in a suitable solvent and the resulting solution treated with an aqueous extractant whereupon the water soluble impurities are extracted without significant loss of product. The product or products are thereupon removed from the solvent solution by fractional crystallization, whereby a complete yield of the product, ranging from an excellent to a fair state of purity, depending upon the complexity of the crude product, is obtained. After adjusting the concentration of the solution, if desired, by addition or removal of solvent, the solution is allowed' to cool or the solvent is removed until the desired fraction has crystallized. After separating the crystallized product and further adjustment of the concentration, if desired, by removal of solvent and warming, the second fraction is allowed to crystallize. In an analogous manner, as many fractions as desired are allowed to crystallize and are removed. The last fraction is recovered by evaporating, or preferably distilling, off the remaining solvent. Although this last fraction will necessarily contain more water soluble impurities than the preceding fractions, it is nevertheless a substantially pure product in this respect, since all water soluble impurities are removed by the above-mentioned aqueous extraction.

In such cases where, for example, the mixed reaction products are applicable or desirable or in such cases where only a single reaction product is formed, the product may be recovered by evaporation, or preferably distillation, of the solvent. Since the solvents used form azeotropic mixtures with water, one is able to obtain the product in a very dry state. In such cases where the amount of solvent required is insufficient to form an azeotropic mixture with all the water present, addition of an azeotrope forming compound before or during the distillation may be resorted to, or the distillate solvent phase may be returned to the still until the water is completely removed. Small quantities of solvent remaining in the product may be removed by blowing, heating, vacuum or any of the suitable known methods.

A suitable solvent is one which dissolves the product in question, is substantially insoluble in water, is a relatively poor solvent for the undesirable water soluble impurities, is substantially chemically inert to the materials under consideration, and is removable from the crystallized product by one of the usual methods.

We have found that ethers and ketones having at least five carbon atoms are eminently suited for the purpose at hand. Although diethyl ether is not well suited, we have found that ethyl propyl ether, and more particularly, ethyl isopropyl ether, are suitable. Asymmetry and branched radicals have been found to be factors determining the suitability of a solvent. Thus, diisopropyl ether is not quite as suitable as ethyl isopropyl ether, and again, ethyl tertiary butyl ether is exceptionally well suited. As the molecular weight of the ethers is further increased, the solvent power decreases and the solvent becomes more difficult to remove completely from the crystallized product.

Likewise with the ketones, we have found that methyl isopropyl, ethyl isopropyl, methyl tertiary butyl, ethyl isobutyl and diisopropyl ketone, etc., are well suited, and that asymmetry and iso or tertiary radicals contribute to the suitability of the solvent.

We have found that the proper choice of solvent is somewhat dependent upon the product in question, and that in general, it is advantageous to choose a solvent that will afford sufficient solubility with the least amount of association. Thus, although the more common organic solvents, such as paraffinic, olefinic, cycloparaffinic, aromatic, aralykyl hydrocarbons and esters are not generally suitable, they may be used advantageously in many cases in conjunction with the above-mentioned ethers or ketones to produce a solvent mixture of optimum suitability for the product in question. Thus, when used in conjunction with, for example, a hydrocarbon, diethyl ether may in some cases be used advantageously.

We have found that some members of the class of chlorinated solvents, such as trichlorethylene, when used in conjunction with other solvents, may approach the ethers and ketones in suitability. Here again, symmetry and branched structure play an important role. Chloroform and carbon tetrachloride are unsuitable, but in a few cases may be used in conjunction with other solvents. For example, chloroform with a paraffin hydrocarbon or carbon tetrachloride with an ether.

Our process is applicable to the purification of a variety of products, and is especially suited for the purification of the class of compounds known as imido alkylols, and most particularly to such of these as are formed from unsaturated fatty acids. These compounds, which are usually solids, may be easily produced by reacting a suitable fatty acid or its ester with an alkylolamine, and are described in U. S. Patent 1,990,453. The reaction product, when using the more common animal or vegetable oils, fats, waxes, etc., as a source of fatty acid, consists of mixtures of saturated and unsaturated imido alkylols along with alkylolamine, glycerine, etc. This crude product is freed from water soluble impurities, separated in fractions of individual compounds or into fractions having individual characteristics, and recovered completely when treated in accordance with our invention. The invention in its broader aspect is applicable for the recovery, removal of water soluble impurities from, and separation of, such preferably solid products of substantially aliphatic character as result from the reaction of fatty acids or derivatives thereof with water soluble reactants. Thus, for example, in the production of the solid nitriles, amides, ketones, ketols, thioamides, metal soaps, etc., use can be made of the principle and solvents herein disclosed.

The extraction of the water soluble impurities from the solvent mixture may be executed either at normal or slightly elevated temperatures. An elevated temperature may often be advantageous, since it affords the use of less solvent and in many cases allows the crystallization of the larger part of the product by simply cooling.

As previously mentioned, the method of washing the water soluble impurities from the molten product usually results in emulsions. This tendency sometimes persists even when using the present method wherein the product is dissolved in a suitable solvent. If such emulsion difficulties arise, they may usually be overcome by diluting the solution with more solvent. The solution may again be concentrated by removal of solvent before crystallization. Since, according to the present method, the extractant is contacted with a very mobile solution, the extraction may be carried out with a minimum of agitation, as, for instance, in a continuous manner, with the consequent avoidance of emulsions. Further, if the product in question is or contains a very strong emulsifying agent, the use of a salt solution may be used for the main extraction, and if the salt is objectionable in the product, traces of the same may be removed by a short water wash. The effect of such salt solutions for breaking and preventing emulsions is well known. Any of the salts commonly used for this purpose may be used.

The invention may be executed in a batch, intermittent, or continuous manner.

When using a glyceride as a source of fatty acid, the liberated glycerine is removed from the desired product with the aqueous extractant. This glycerine may generally be easily and economically recovered from the extract phase.

As illustrative of the effectiveness of our invention, we offer the following examples, which, it is to be understood, are not to be considered as limiting the scope of the invention as to products treated, solvents used, etc.

*Example I*

An unhydrogenated cottonseed oil consisting of 70 to 80 percent unsaturated glycerides was digested at about 170° C. for 2½ hours with a 10% excess of ethanolamine. The crude reaction product was dissolved in ethyl tertiary-butyl ether and the solution extracted three times with ¼ volume of water. Removal of the water soluble impurities such as ethanolamine, glycerine, etc., was substantially complete. The washed solution was divided into two parts and these were treated separately. In the first case, the solvent was distilled off to give a quantitative recovery of mixed saturated and unsaturated imido alkylols. In the second case, a portion of the solvent was removed and the saturated imido alkylols were crystallized out by cooling. Thus by fractional crystallization the unsaturated imido alkylols were separated from the saturated imido alkylols and both products were obtained free from water soluble impurities.

*Example II*

A sardine oil having an iodine number of 152 gm. I₂/100 gm. and a saponification value of 0.327 equiv./100 gm. was reacted with a 10% excess of ethanolamine at 165°–171° C. for three hours. The dark brown crude product was dissolved in three volumes of ethyl tertiarybutyl ether at about 45° C. The solution was extracted three times with ¼ volume of water. The ether was distilled off leaving 100% yield of a product having a melting point of 63°–65° C. and containing only 0.02% water soluble matter. By crystallizing from acetone, on the other hand, a yield of from 20–30% was obtained, and the remaining 70–80% consisting of unsaturated imido alkylols could not be recovered free from impurities.

*Example III*

A hydrogenated cottonseed oil having a saponification value of 0.346 equiv./100 gms. and an iodine number of 3.35 gms. I₂/100 gms. was reacted with a 13% excess of isobutanolamine at 175° C. for seven hours. The crude reaction product was dissolved in ethyl tertiarybutyl ether at about 45–50° C. The solution was extracted three times with ¼ of its volume of water. Upon cooling the solution to 0° C., 75.6% of the total product crystallized out. The water soluble impurities were less than 0.02%. On distilling off the solvent, the remaining 24.4% was recovered. This latter material was of a substantially different character than the first fraction having a softer consistency and lower melting point.

The advantages realizable through the use of our invention are: a complete yield of the desired product or products free from water soluble impurities is obtainable, a moisture free product is readily obtainable, mixed fatty acids or their derivatives may be used as raw material, and the reaction products may be economically separated into fractions having characteristic hardness, melting range, solubility, degree of unsaturation, etc.

Having described our invention in its preferred embodiment, and having given specific examples for the purpose of illustrating its use, we claim as our invention all that is commensurate with the scope of the appended claims.

We claim as our invention:

1. In the purification of imido alkylols, the steps comprising dissolving the crude imido alkylols in a liquid compound selected from the group consisting of the ethers and ketones having at least five carbon atoms, subjecting the solution to a washing treatment with an aqueous extractant and recovering a purified product from the solution.

2. In the purification of imido alkylols, the steps comprising dissolving the crude product in a liquid ether having at least five carbon atoms, subjecting the solution to a washing treatment with an aqueous extractant, and recovering a purified product from the solution.

3. In the purification of imido alkylols, the steps comprising dissolving the crude product in a liquid asymmetrical ether having at least five carbon atoms, subjecting the solution to a washing treatment with an aqueous extractant, and recovering a purified product from the solution.

4. In the purification of imido alkylols, the steps comprising dissolving the crude product in a liquid asymmetrical ether having at least five carbon atoms and having in at least one radical a branched chain structure, subjecting the solution to a washing treatment with an aqueous extractant and recovering a purified product from the solution.

5. In the purification of imido alkylols, the steps comprising dissolving the crude product in ethyl tertiarybutyl ether, subjecting the solution to a washing treatment with an aqueous extractant, and recovering a purified product from the solution.

6. In the purification of imido alkylols, the steps comprising dissolving the crude product in a liquid ketone having at least five carbon atoms, subjecting the solution to a washing treatment with an aqueous extractant, and recovering a purified product from the solution.

7. In the purification of imido alkylols, the steps comprising dissolving the crude product in a liquid asymmetrical ketone containing at least five carbon atoms, subjecting the solution to a washing treatment with an aqueous extractant, and recovering a purified product from the solution.

8. In the purification of imido alkylols, the steps comprising dissolving the crude product in a liquid asymmetrical ketone having at least five carbon atoms and having in at least one radical a branched chain structure, subjecting the solution to a washing treatment with an aqueous extractant, and recovering a purified product from the solution.

9. In the purification of imido alkylols, the steps comprising dissolving the crude product in methyl isopropyl ketone, subjecting the solution to a washing treatment with an aqueous extractant, and recovering a purified product from the solution.

10. A process for the purification and separate recovery of normally solid saturated and unsaturated higher fatty acid derivatives obtained by reaction of a higher fatty acyl compound with a water-soluble reactant which comprises dissolving the crude performed mixture of solid higher fatty acid derivatives in a substantially water-immiscible liquid mixture consisting of a liquid hydrocarbon and of a compound selected from the group consisting of the ethers and ketones having at least five carbon atoms, subjecting the solution to a washing treatment with an aqueous extractant, and recovering the saturated product and the unsaturated product in separate fractions by fractional crystallization from said solution.

11. Process for the separate recovery of normally solid saturated and unsaturated imido alkylols which comprises the steps of dissolving a crude relatively water-insoluble performed product, obtained by reacting a mixture of saturated and unsaturated carboxylic compounds with a water-soluble alkanolamine, in a liquid selected from the group consisting of ethers and ketones having at least five carbon atoms, subjecting the solution to a washing treatment with an aqueous extractant, and fractionally crystallizing imido alkylols from the solution.

12. Process for the separate recovery of normally solid saturated and unsaturated imido alkylols which comprise the steps of dissolving a crude relatively water-insoluble performed product, obtained by reacting a mixture of saturated and unsaturated carboxylic compounds with a water-soluble alkanolamine, in a substantially water-immiscible liquid mixture consisting of a liquid hydrocarbon and of a compound selected from the group consisting of the ethers and ketones having at least five carbon atoms, subjecting the solution to a washing treatment with an aqueous extractant, and fractionally crystallizing imido alkylols from the solution.

13. Process for the separate recovery of normally solid saturated and unsaturated derivatives of higher fatty acids which comprises the steps of dissolving a crude relatively water-insoluble performed product, obtained by reacting a mixture of saturated and unsaturated higher fatty acyl compounds with a water-soluble reactant, in a liquid compound selected from the group consisting of the ethers and ketones having at least five carbon atoms, subjecting the solution to a washing treatment with an aqueous extractant, and fractionally crystallizing purified carboxylic acid derivatives from the solution.

14. In the purification of imido alkylols the steps comprising dissolving a crude imido alkylol in a lower-boiling substantially water-immiscible solvent in which the imido alkylol has an appreciable but limited solubility, subjecting the solution to a washing treatment with an aqueous extractant, and recovering a purified imido alkylol from the solution.

15. In the purification of higher fatty acid derivatives obtained by reaction of a higher fatty acyl compound with a water-soluble reactant, the steps comprising dissolving a crude fatty acid derivative in a liquid compound selected from the group consisting of the ethers and ketones having at least five carbon atoms, subjecting the solution to a washing treatment with an aqueous extractant, and recovering a purified fatty acid derivative from the solution.

SUMNER H. McALLISTER.
GEORGE F. JOHNSON.